(12) United States Patent
Takeuchi et al.

(10) Patent No.: US 10,950,066 B2
(45) Date of Patent: Mar. 16, 2021

(54) CONTROL TRANSMISSION DEVICE, MAINTENANCE COMMUNICATION DEVICE, AND TRAIN MAINTENANCE SYSTEM

(71) Applicant: Mitsubishi Electric Corporation, Tokyo (JP)

(72) Inventors: Takeshi Takeuchi, Tokyo (JP); Naomi Irie, Tokyo (JP); Satoshi Kaede, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/484,987

(22) PCT Filed: Feb. 15, 2017

(86) PCT No.: PCT/JP2017/005557
§ 371 (c)(1),
(2) Date: Aug. 9, 2019

(87) PCT Pub. No.: WO2018/150491
PCT Pub. Date: Aug. 23, 2018

(65) Prior Publication Data
US 2020/0005556 A1 Jan. 2, 2020

(51) Int. Cl.
H04W 4/12 (2009.01)
G07C 5/00 (2006.01)
(Continued)

(52) U.S. Cl.
CPC .......... G07C 5/008 (2013.01); B61L 27/0005 (2013.01); B61L 27/0094 (2013.01);
(Continued)

(58) Field of Classification Search
CPC ......... G07C 5/008; G07C 5/006; H04W 4/42; H04W 76/15; H04W 76/11; B61L 27/0005; B61L 27/0094
(Continued)

(56) References Cited

U.S. PATENT DOCUMENTS 1,560,878 A * 11/1925 Tatum ...................... B61B 1/00
104/26.1
1,742,771 A * 1/1930 Kipp ........................ B61K 5/00
118/326
(Continued)

FOREIGN PATENT DOCUMENTS

JP 2003344227 A 12/2003
JP 2011010279 A 1/2011
(Continued)

OTHER PUBLICATIONS

International Search Report (PCT/ISA/210) dated May 16, 2017, by the Japan Patent Office as the International Searching Authority for International Application No. PCT/JP2017/005557.
(Continued)

Primary Examiner — Hai V Nguyen
(74) Attorney, Agent, or Firm — Buchanan Ingersoll & Rooney PC

(57) ABSTRACT

An object is to enable wireless communication between a portable terminal and on-board devices, and enable wireless connection to a train composition to be subjected to maintenance even in the presence of a plurality of train compositions. A control transmission device is mounted on a train and includes: a port connectable by wire to a maintenance communication device that is an external terminal; a train composition number notification unit that provides notification of a train composition number of the train; and a wireless network ID reception unit that receives a wireless network ID for constructing a wireless network. The wire-
(Continued)

less network ID received by the wireless network ID reception unit is generated based on the train composition number provided by the train composition number notification unit.

14 Claims, 6 Drawing Sheets

(51) Int. Cl.
    *H04W 4/42*         (2018.01)
    *H04W 76/15*       (2018.01)
    *H04W 76/11*       (2018.01)
    *B61L 27/00*        (2006.01)
(52) U.S. Cl.
    CPC .............. *G07C 5/006* (2013.01); *H04W 4/42* (2018.02); *H04W 76/11* (2018.02); *H04W 76/15* (2018.02)
(58) Field of Classification Search
    USPC .................................. 455/500; 340/1.1–16.1
    See application file for complete search history.

(56) References Cited

U.S. PATENT DOCUMENTS

| | | | | |
|---|---|---|---|---|
| 2,948,234 A * | 8/1960 | Donald | B61L 3/121 104/26.1 |
| 2,951,452 A * | 9/1960 | Karlet | B61L 3/127 104/26.1 |
| 2,976,817 A * | 3/1961 | Stapp | B61J 1/10 104/26.1 |
| 3,442,223 A * | 5/1969 | Graham | B61J 1/10 104/48 |
| 3,944,986 A * | 3/1976 | Staples | B61L 17/00 104/88.04 |
| 4,154,170 A * | 5/1979 | Williams | B61J 3/00 104/122 |
| 4,770,122 A * | 9/1988 | Ichihashi | B05B 12/14 104/26.1 |
| 5,072,900 A * | 12/1991 | Malon | B61L 27/0038 246/182 B |
| 5,445,347 A * | 8/1995 | Ng | B61L 15/0027 246/169 R |
| 5,719,771 A * | 2/1998 | Buck | G07C 5/008 340/438 |
| 5,867,801 A * | 2/1999 | Denny | B61L 3/125 246/169 R |
| 5,947,423 A * | 9/1999 | Clifton | B61L 27/0038 246/62 |
| 6,125,311 A * | 9/2000 | Lo | B61L 27/0088 701/19 |
| 6,154,735 A * | 11/2000 | Crone | B61L 27/0022 706/45 |
| 6,263,265 B1 * | 7/2001 | Fera | B61L 27/0094 701/19 |
| 6,587,763 B2 * | 7/2003 | Ishikawa | B61L 3/125 246/3 |
| 6,622,067 B1 * | 9/2003 | Lovelace, II | B61L 3/125 701/19 |
| 6,718,238 B1 * | 4/2004 | Laguer-Diaz | B61L 3/125 701/31.5 |
| 6,769,162 B1 * | 8/2004 | Barich | B61J 1/10 104/26.1 |
| 6,959,235 B1 * | 10/2005 | Abdel-Malek | B61L 27/0094 701/29.4 |
| 7,184,707 B2 * | 2/2007 | Tada | H04W 76/10 455/41.3 |
| 7,188,341 B1 * | 3/2007 | Hawthorne | B61L 3/125 717/171 |
| 7,209,817 B2 * | 4/2007 | Abdel-Malek | B61L 27/0094 701/29.4 |
| 7,236,462 B2 * | 6/2007 | Davenport | H04B 17/318 370/252 |
| 7,263,475 B2 * | 8/2007 | Hawthorne | B61L 3/125 703/8 |
| 7,266,515 B2 * | 9/2007 | Costello | B61K 13/00 705/26.8 |
| 7,286,040 B2 * | 10/2007 | Karabinis | G01D 21/00 340/10.1 |
| 7,457,691 B2 * | 11/2008 | Muinonen | B61L 17/00 246/162 |
| 7,512,481 B2 * | 3/2009 | Julich | B61L 27/0016 701/117 |
| 7,627,546 B2 * | 12/2009 | Moser | B61K 13/00 |
| 7,680,750 B2 * | 3/2010 | Daum | G06Q 10/04 706/19 |
| 7,715,977 B2 * | 5/2010 | Julich | B61L 27/0027 701/117 |
| 7,725,249 B2 * | 5/2010 | Kickbusch | B61L 27/0011 701/117 |
| 7,734,383 B2 * | 6/2010 | Philp | B61L 27/0027 701/19 |
| 7,742,848 B2 * | 6/2010 | Muinonen | B61L 17/00 701/19 |
| 7,742,849 B2 * | 6/2010 | Muinonen | B61L 17/00 701/19 |
| 7,747,362 B2 * | 6/2010 | Muinonen | B61L 17/00 701/19 |
| 7,751,952 B2 * | 7/2010 | Muinonen | B61L 17/00 701/19 |
| 7,792,616 B2 * | 9/2010 | Muinonen | B61L 17/00 701/19 |
| 7,797,087 B2 * | 9/2010 | Philp | B61L 27/0022 701/19 |
| 7,797,088 B2 * | 9/2010 | Philp | B61L 27/0027 701/19 |
| 7,801,185 B2 * | 9/2010 | Krzyzanowski | H04L 12/282 370/522 |
| 7,813,846 B2 * | 10/2010 | Wills | B61L 17/00 701/19 |
| 7,818,101 B2 * | 10/2010 | Muinonen | B61L 17/00 701/19 |
| 7,831,342 B2 * | 11/2010 | Muinonen | B61L 17/00 701/19 |
| 7,844,078 B1 * | 11/2010 | Arcaini | B61L 17/02 382/104 |
| 7,885,736 B2 * | 2/2011 | Muinonen | B61L 17/00 701/19 |
| 7,908,047 B2 * | 3/2011 | Smith | B61L 27/0011 701/19 |
| 7,937,193 B2 * | 5/2011 | Philp | B61L 27/0016 701/19 |
| 7,957,321 B2 * | 6/2011 | Krzyzanowski | H04L 12/2805 370/254 |
| 7,983,806 B2 * | 7/2011 | Muinonen | B61L 17/00 701/19 |
| 8,019,497 B2 * | 9/2011 | Muinonen | B61L 17/00 701/19 |
| 8,055,397 B2 * | 11/2011 | Pathak | B61L 17/02 701/19 |
| 8,060,263 B2 * | 11/2011 | Muinonen | B61L 17/00 701/19 |
| 8,082,071 B2 * | 12/2011 | Daum | B61L 27/0033 701/19 |
| 8,140,250 B2 * | 3/2012 | Mian | H04Q 9/00 701/117 |
| 8,239,079 B2 * | 8/2012 | Pathak | B61L 17/00 701/19 |
| 8,292,172 B2 * | 10/2012 | Logan | G07C 3/14 235/385 |
| 8,332,086 B2 * | 12/2012 | Muinonen | B61L 17/02 701/19 |
| 8,433,461 B2 * | 4/2013 | Daum | B61L 27/0016 701/19 |
| 8,467,920 B2 * | 6/2013 | Asuka | B61L 23/14 701/19 |
| 8,494,695 B2 * | 7/2013 | Cooper | H04L 67/12 701/19 |

(56) References Cited

U.S. PATENT DOCUMENTS

| | | | | |
|---|---|---|---|---|
| 8,498,762 B2* | 7/2013 | Wills | B61L 27/0027 | 701/19 |
| 8,548,654 B2* | 10/2013 | Katsuta | B61L 27/0038 | 701/19 |
| 8,596,587 B2* | 12/2013 | Hilleary | B61L 23/041 | 246/125 |
| 8,611,236 B2* | 12/2013 | Nakamura | H04L 43/0817 | 370/252 |
| 8,612,636 B2* | 12/2013 | Yu | H04L 67/303 | 710/8 |
| 8,645,515 B2* | 2/2014 | Keith, Jr. | G06F 9/54 | 709/223 |
| 8,655,540 B2* | 2/2014 | Mian | H04Q 9/00 | 701/29.1 |
| 8,812,613 B2* | 8/2014 | Keith, Jr. | G06F 8/65 | 709/217 |
| 8,855,009 B2* | 10/2014 | Niiyama | G07C 5/0808 | 370/254 |
| 8,990,770 B2* | 3/2015 | van der Zweep | G06Q 10/20 | 717/121 |
| 9,003,655 B2* | 4/2015 | Hanreich | B23P 6/002 | 29/889.1 |
| 9,221,477 B2* | 12/2015 | Cooper | H04L 67/14 | |
| 9,239,991 B2* | 1/2016 | Connolly | G06Q 30/016 | |
| 9,379,775 B2* | 6/2016 | Cooper | B61L 15/0036 | |
| 9,514,395 B2* | 12/2016 | Yu | H04L 67/04 | |
| 9,569,194 B2* | 2/2017 | Keith, Jr. | H04L 67/306 | |
| 9,669,853 B2* | 6/2017 | Kurita | B61L 15/0027 | |
| 9,684,903 B2* | 6/2017 | Connolly | G06Q 30/016 | |
| 9,764,749 B2* | 9/2017 | El Fassi | B61L 13/04 | |
| 9,801,027 B2* | 10/2017 | Levy | G08G 1/123 | |
| 9,857,963 B2* | 1/2018 | Yu | G06F 3/1292 | |
| 9,907,016 B2* | 2/2018 | Shibata | H04W 48/18 | |
| 9,917,773 B2* | 3/2018 | Cooper | B61L 15/0072 | |
| 9,934,624 B2* | 4/2018 | Lewis | G07C 5/0808 | |
| 10,023,162 B2* | 7/2018 | Shiratsuchi | B60T 8/172 | |
| 10,026,240 B2* | 7/2018 | Ezawa | G06N 20/00 | |
| 10,136,106 B2* | 11/2018 | Shubs, Jr. | H04N 5/23203 | |
| 10,196,078 B2* | 2/2019 | Shubs, Jr. | B61L 15/0081 | |
| 10,269,191 B2* | 4/2019 | Lewis | G07C 5/0808 | |
| 10,353,561 B2* | 7/2019 | Yu | H04L 69/18 | |
| 10,414,629 B2* | 9/2019 | Nanjappan | H04M 1/72563 | |
| 10,469,448 B2* | 11/2019 | Kamalakantha | H04L 61/2007 | |
| 10,498,471 B2* | 12/2019 | Suzuki | H04B 1/7136 | |
| 10,516,995 B2* | 12/2019 | Shibata | H04W 12/06 | |
| 10,536,432 B2* | 1/2020 | Kicherer | H04L 61/2038 | |
| 10,560,821 B2* | 2/2020 | Levy | H04W 4/029 | |
| 2001/0052858 A1* | 12/2001 | Vincent | G05B 19/042 | 340/12.25 |
| 2002/0059075 A1* | 5/2002 | Schick | B61L 27/0094 | 701/31.4 |
| 2004/0093196 A1* | 5/2004 | Hawthorne | B61L 15/0072 | 703/8 |
| 2005/0143874 A1* | 6/2005 | Peltz | B61L 25/028 | 701/19 |
| 2005/0171661 A1* | 8/2005 | Abdel-Malek | G07C 5/008 | 701/31.4 |
| 2009/0055041 A1* | 2/2009 | Mian | B61L 27/0094 | 701/31.4 |
| 2009/0055043 A1* | 2/2009 | Mian | G06Q 50/30 | 701/31.4 |
| 2010/0302974 A1* | 12/2010 | Niiyama | G07C 5/0808 | 370/254 |
| 2011/0108677 A1* | 5/2011 | Asuka | B61L 23/14 | 246/27 |
| 2012/0286103 A1* | 11/2012 | Hilleary | B61L 23/041 | 246/125 |
| 2014/0156135 A1* | 6/2014 | Maki | B61L 15/0027 | 701/29.1 |
| 2015/0200712 A1* | 7/2015 | Cooper | B60T 17/228 | 375/257 |
| 2016/0174049 A1* | 6/2016 | Levy | G08G 1/0112 | 455/456.5 |
| 2016/0176424 A1* | 6/2016 | Kupiec | G05D 1/0011 | 701/2 |
| 2016/0272228 A1* | 9/2016 | LeFebvre | B61L 15/0027 | |
| 2016/0359741 A1* | 12/2016 | Cooper | B61C 17/12 | |
| 2017/0043799 A1* | 2/2017 | Shubs | B61L 27/0077 | |
| 2017/0106883 A1* | 4/2017 | Shubs, Jr. | B61L 15/0081 | |
| 2017/0151970 A1* | 6/2017 | Shubs, Jr. | B61L 25/028 | |
| 2017/0151971 A1* | 6/2017 | Shubs, Jr. | B61L 27/0094 | |
| 2017/0154301 A1* | 6/2017 | Stevenson | G01F 23/14 | |
| 2017/0178426 A1* | 6/2017 | Ezawa | B61L 27/0094 | |
| 2017/0197646 A1* | 7/2017 | Shubs, Jr. | B61L 27/0077 | |
| 2017/0203776 A1* | 7/2017 | Fuchs | B61L 25/048 | |
| 2017/0278061 A1* | 9/2017 | Skaaksrud | H04W 4/029 | |
| 2018/0027387 A1* | 1/2018 | Levy | H04W 4/40 | 455/456.5 |
| 2018/0047225 A1* | 2/2018 | Batcheller | G07C 5/008 | |
| 2018/0205650 A1* | 7/2018 | Cooper | H04B 3/00 | |
| 2018/0310146 A1* | 10/2018 | Levy | H04W 4/40 | |
| 2019/0028214 A1* | 1/2019 | Suzuki | H04B 17/309 | |
| 2020/0005556 A1* | 1/2020 | Takeuchi | H04W 76/15 | |

FOREIGN PATENT DOCUMENTS

| | | |
|---|---|---|
| JP | 2013049395 A | 3/2013 |
| JP | 2013118560 A | 6/2013 |
| JP | 2016165096 A | 9/2016 |

OTHER PUBLICATIONS

Written Opinion (PCT/ISA/237) dated May 16, 2017, by the Japan Patent Office as the International Searching Authority for International Application No. PCT/JP2017/005557.

3machine Notification of Reason for Refusal of JP Patent Application No. 2019-500090 dated Jul. 9, 2019 with translation (7 pages).

Office Action dated Jul. 21, 2020, by the India Patent Office in corresponding India Patent Application No. 201947030217 and English translation of the Office Action. (5 pages).

* cited by examiner

CONTROL TRANSMISSION DEVICE, MAINTENANCE COMMUNICATION DEVICE, AND TRAIN MAINTENANCE SYSTEM

FIELD

The present invention relates to a control transmission device, a maintenance communication device, a train maintenance communication program, and a train maintenance system for a train.

BACKGROUND

Various instruments mounted on railroad cars need to regularly undergo maintenance and inspection.

Patent Literature 1 discloses a system for performing maintenance and inspection by using wireless local area network (LAN) communication between a central control device and a wireless-enabled portable terminal device held by an inspection operator.

CITATION LIST

Patent Literature

Patent Literature 1: Japanese Patent Application Laid-open No. 2003-344227

SUMMARY

Technical Problem

However, the above-mentioned conventional technique has a problem in that the portable terminal can operate the central control device by wireless communication but cannot operate on-board devices by wireless communication.

The present invention has been made in view of the above, and an object thereof is to enable wireless communication between a portable terminal and on-board devices, and enable wireless connection to a train composition to be subjected to maintenance even in the presence of a plurality of train compositions.

Solution to Problem

A control transmission device according to an aspect of the present invention is mounted on a train and includes: a port connectable by wire to an external terminal; a train composition number notification unit that provides notification of a train composition number of the train; and a wireless network ID reception unit that receives a wireless network ID for constructing a wireless network, and the wireless network ID received by the wireless network ID reception unit is generated based on the train composition number provided by the train composition number notification unit.

Advantageous Effects of Invention

The present invention can achieve the effect of enabling wireless communication between a portable terminal and on-board devices, and enabling wireless connection to a train composition to be subjected to maintenance even in the presence of a plurality of train compositions.

DESCRIPTION OF EMBODIMENTS

Hereinafter, a control transmission device, a maintenance communication device, a train maintenance communication program, and a train maintenance system according to an embodiment of the present invention will be described in detail based on the drawings. The present invention is not limited to the embodiment.

Embodiment

Figure 1:
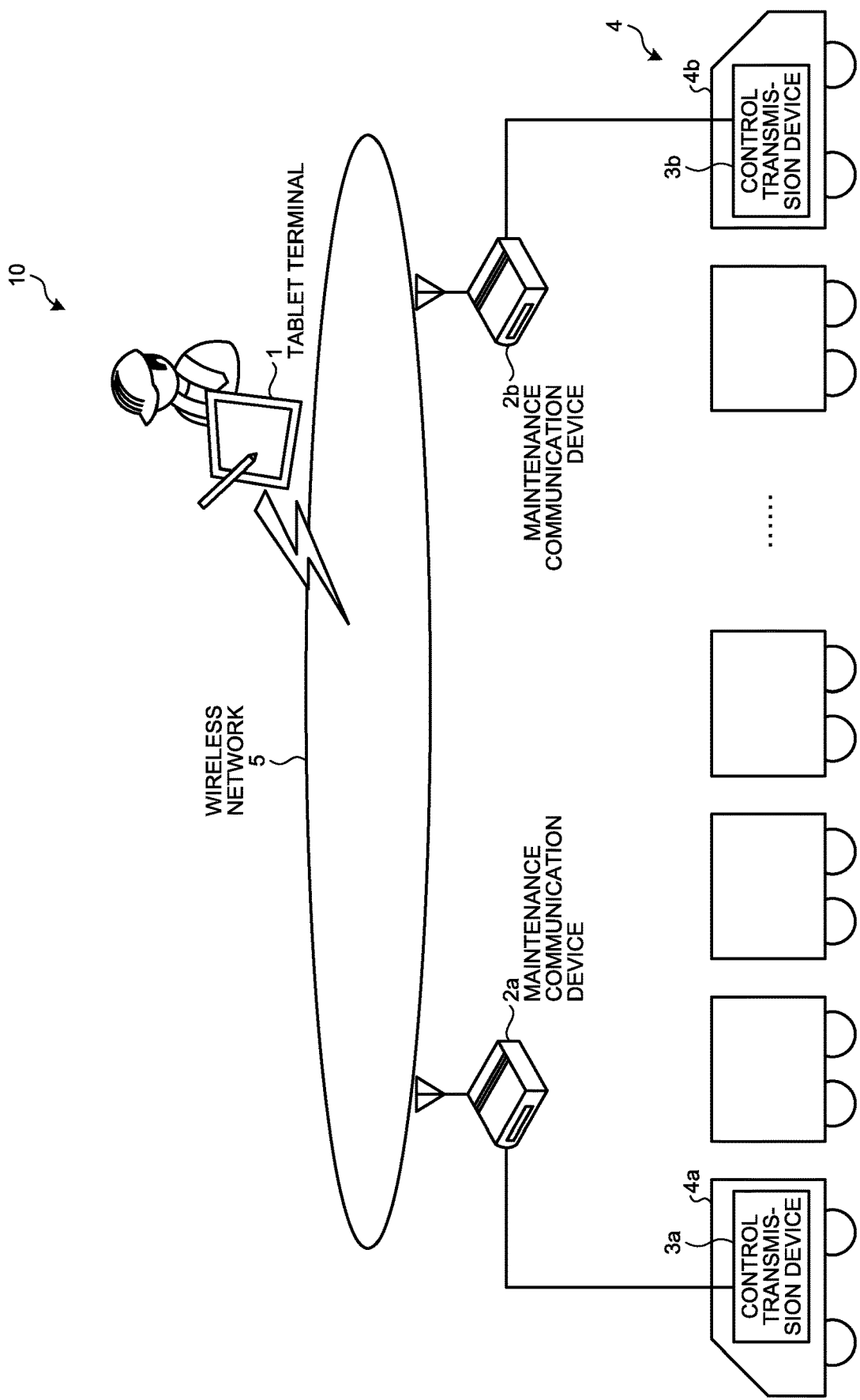
FIG. 1 is a schematic diagram illustrating a configuration of a train maintenance system according to an embodiment.

FIG. 1 is a schematic diagram illustrating a configuration of a train maintenance system according to an embodiment of the present invention. The train maintenance system 10 illustrated in FIG. 1 includes a tablet terminal 1, maintenance communication devices 2a and 2b, and control transmission devices 3a and 3b.

The tablet terminal 1 is a portable terminal capable of wirelessly communicating with the control transmission devices 3a and 3b using a wireless network constructed by the maintenance communication devices 2a and 2b. On the tablet terminal 1, screens that are the same as or similar to the screens of cab monitors (not illustrated) in cars 4a and 4b are displayed. Because the tablet terminal 1 has portability, an operator who performs maintenance work can check the screens displayed on the cab monitors while visually monitoring the operation of instruments.

The maintenance communication devices 2a and 2b are devices that construct a unique wireless network 5 for each train composition to be subjected to maintenance. The maintenance communication device 2a is mounted on the car 4a, and the maintenance communication device 2b is mounted on the car 4b.

The control transmission devices 3a and 3b are car electrical devices each correspondingly mounted on the cab monitors. A train 4 equipped with at least the control transmission devices 3a and 3b includes the car 4a equipped with the control transmission device 3a and the car 4b equipped with the control transmission device 3b. The cars 4a and 4b are cars of the same train composition. When the car 4a is the lead car, the car 4b is the last car, and when the car 4b is the lead car, the car 4a is the last car. Note that the control transmission device 3a is connected by wire to the maintenance communication device 2a which is an external terminal, and the control transmission device 3b is connected by wire to the maintenance communication device 2b which is an external terminal.

The train maintenance system 10 illustrated in FIG. 1 is used for maintenance and inspection of a train, i.e. railroad cars, at a railyard. Recent railroad cars include a system that allows the operation states of the control transmission devices 3a and 3b, car electrical devices provided in the train, to be checked on the cab monitors installed in the car 4a and the car 4b, respectively, and allows each of the car electrical devices to be controlled through corresponding one of these cab monitors. Each of the control transmission devices 3a and 3b returns screen configuration data necessary for display on the corresponding cab monitor in response to a request from the cab monitor. The control transmission devices 3a and 3b can also respond to requests for screen configuration data from devices other than the cab monitors. For example, each of the control transmission devices 3a and 3b responds to a request from the tablet terminal 1. However, in many cases, each of the control transmission devices 3a and 3b does not have an instrument for constructing a wireless network or a wireless communication function. Accordingly, each of the control transmission devices 3a and 3b is enabled to wirelessly communicate with the tablet terminal 1 that is a portable terminal, by being connected to the complementary maintenance communication devices 2a and 2b, respectively.

In such cases, it is necessary to construct a wireless network for use by the tablet terminal 1 and the maintenance communication devices 2a and 2b. However, in the case of railroad car maintenance at a railyard, a plurality of train maintenance systems operates on adjacent pit tracks. Thus, the train maintenance system 10 has the configuration illustrated in FIG. 2 so as to discriminate the wireless network of each train composition.

Figure 2:
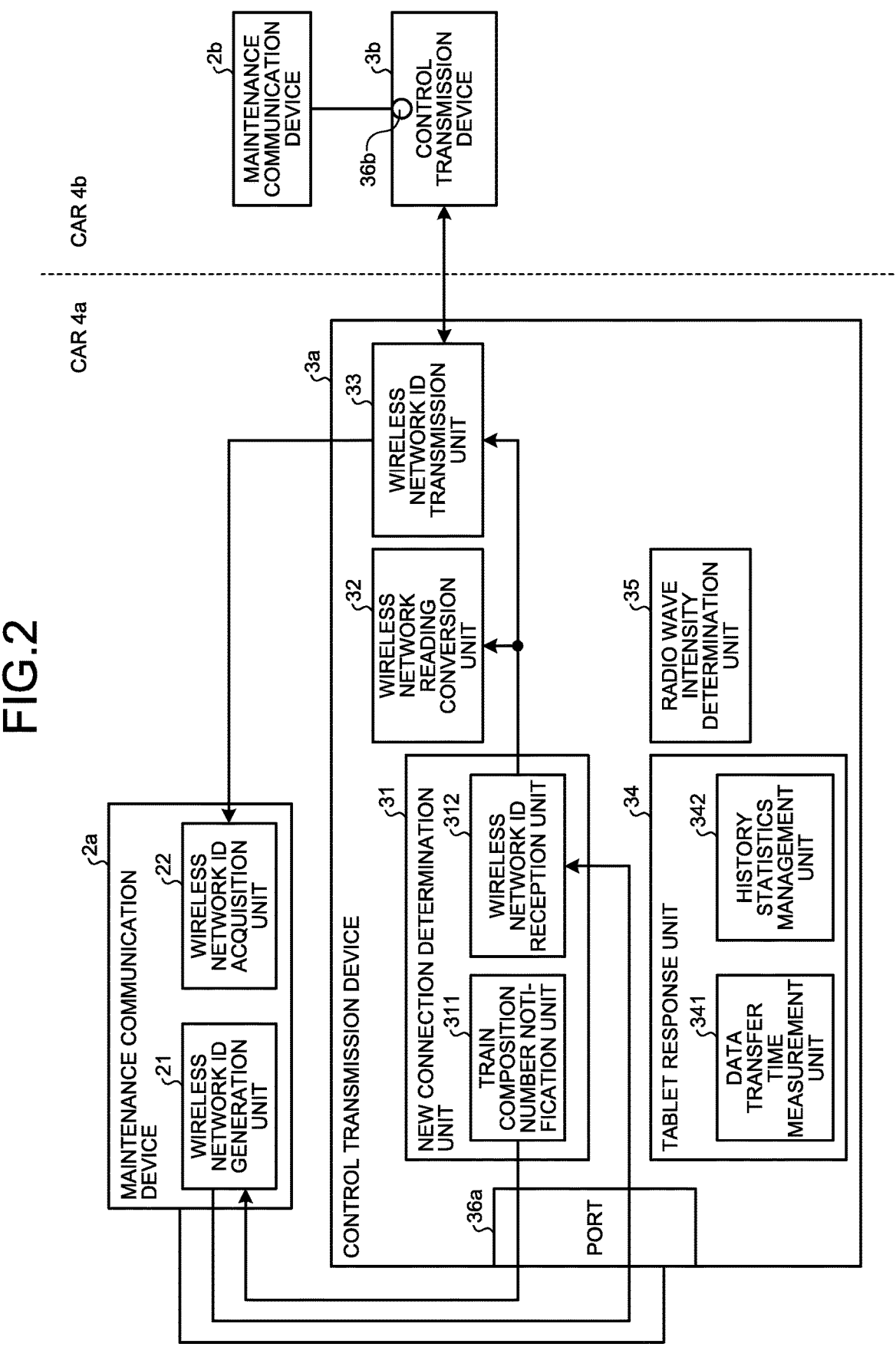
FIG. 2 is a block diagram illustrating a configuration of the train maintenance system according to the embodiment.

FIG. 2 is a block diagram illustrating the configuration of the train maintenance system according to the embodiment of the present invention. The illustration of the train maintenance system 10 in FIG. 2 contains a detailed configuration of the maintenance communication device 2a and the control transmission device 3a in the car 4a illustrated in FIG. 1. Because the configuration of the car 4b is similar to the configuration of the car 4a, it is not depicted in detail. In the following description, components in the car 4a may be assigned the ordinal number "first", and components in the car 4b may be assigned the ordinal number "second". The cars 4a and 4b are cars of the same train composition. The car 4a is the lead car, and the car 4b is the last car.

The maintenance communication device 2a includes a wireless network ID generation unit 21 and a wireless network ID acquisition unit 22. The wireless network ID generation unit 21 generates a wireless network ID using the train composition number as a key in order to construct a unique wireless network for each train composition. The wireless network ID acquisition unit 22 acquires a wireless network ID from a wireless network ID transmission unit 33 or the control transmission device 3b in the car 4b where the other cab is located. An example of a wireless network ID is a service set identifier (SSID).

Here, wireless network IDs in the present embodiment will be described. In the present embodiment, the wireless network ID generation unit 21 generates a wireless network ID each time it is needed. As an example, the train composition number and other variables are included in the variables of a calculation formula stored in the wireless network ID acquisition unit 22, and a wireless network ID is generated each time it is needed.

The train 4 includes a plurality of cars. Therefore, in the case where Wi-Fi (registered trademark) wireless communication is performed, for example, when the maintenance communication device is installed in the cab of the lead car 4a alone, radio waves may not reach the cab of the last car 4b. Thus, as illustrated in FIGS. 1 and 2, the maintenance communication devices are installed in both of the cabs of the lead car and the last car, and use the same wireless network ID. In this case, the maintenance communication devices 2a and 2b must recognize that they are connected to the same train composition, and must share the corresponding wireless network ID to construct a wireless network. Therefore, the control transmission device 3a includes the wireless network ID transmission unit 33, and the maintenance communication device 2a includes the wireless network ID acquisition unit 22. The wireless network ID transmission unit 33 transmits the wireless network ID received by a wireless network ID reception unit 312 to the other control transmission device 3b mounted on the train 4 that is the same train composition.

When detecting the connection of the maintenance communication device 2a, the control transmission device 3a checks whether the wireless network ID reception unit 312 has already received a wireless network ID from the other control transmission device 3b. When the wireless network ID reception unit 312 has not received a wireless network ID, the wireless network ID generation unit 21 generates a wireless network ID and displays a readable image on the cab monitor. The wireless network ID transmission unit 33 transmits this wireless network ID to the control transmission device 3b. When the wireless network ID reception unit 312 has already received a wireless network ID, when the connection of the maintenance communication device 2a to the control transmission device 3a is detected, the wireless network ID acquired by the wireless network ID acquisition unit 22 is used to construct a wireless network. That is, the wireless network is constructed with the already received wireless network ID without activating the wireless network ID generation unit 21. In this manner, between the maintenance communication devices connected to the separate cabs of the same train composition, a wireless network unique to the train composition can be constructed with the same wireless network ID. The notification of the train composition number is triggered by the connection of the maintenance communication device 2a to a port 36a of the control transmission device 3a.

As described above, in the case where Wi-Fi (registered trademark) wireless communication is performed, when the maintenance communication device is installed in the cab of the lead car 4a alone, radio waves may not reach the cab of the last car 4b. Specifically, suppose that the train 4 has ten cars. In this case, the total length of the train 4 is 200 to 300 m. The radio waves from the maintenance communication device installed in the first car, namely, the lead car, are estimated to reach up to the third car, and the radio waves from the maintenance communication device installed in the tenth car, namely, the last car, are estimated to reach up to the eighth car. Extension antennas can be installed in the fourth to seventh cars to deliver radio waves throughout the train 4, thereby enabling wireless communication.

The control transmission device 3a includes a new connection determination unit 31, a wireless network reading conversion unit 32, the wireless network ID transmission unit 33, a tablet response unit 34, a radio wave intensity determination unit 35, and the port 36a connectable by wire to an external terminal. Note that the control transmission device 3b differs from the control transmission device 3a only in that the control transmission device 3b includes a port 36b connectable by wire to an external terminal, instead of the port 36a.

The new connection determination unit 31 includes a train composition number notification unit 311 and the wireless network ID reception unit 312. The train composition number notification unit 311 stores the train composition number, and notifies the wireless network ID generation unit 21 of this train composition number when the control transmission device 3a and the maintenance communication device 2a are newly connected. The wireless network ID reception unit 312 receives the wireless network ID generated by the wireless network ID generation unit 21.

The wireless network reading conversion unit 32 converts the wireless network ID received by the wireless network ID reception unit 312 into an image readable by a camera provided in the tablet terminal 1. The camera provided in the tablet terminal 1 reads this image, whereby the tablet terminal 1 is connected to the wireless network of the train composition to be subjected to maintenance. The image converted by the wireless network reading conversion unit 32 can be, for example, a one-dimensional or two-dimensional barcode. This image is displayed on the cab monitor screen (not illustrated) and read by the camera of the tablet terminal 1. Then, the tablet terminal 1 is connected to the wireless network to be used. Although the wireless network reading conversion unit 32 is not an essential component, the wireless network reading conversion unit 32 can facilitate the acquisition of the wireless network ID by the tablet terminal 1 in this manner.

Note that the wireless network reading conversion unit 32 may convert the wireless network ID into a sound recognizable by the microphone of the tablet terminal 1. In this case, it is sufficient that the cab monitor (not illustrated) is configured to reproduce this sound when the screen of the cab monitor is manipulated. The wireless network ID transmission unit 33 transmits the wireless network ID to the control transmission device 3b in the car 4b where the other cab is located.

The tablet response unit 34 includes a data transfer time measurement unit 341 and a history statistics management unit 342. The data transfer time measurement unit 341 measures the data transfer time for communication of a data request of a fixed size from the tablet terminal 1 to the control transmission device 3a. Such communication is performed at regular intervals between the tablet terminal 1 and the control transmission device 3a. The history statistics management unit 342 records the time for communication measured by the data transfer time measurement unit 341. The radio wave intensity determination unit 35 periodically inquires of the history statistics management unit 342 about the time for communication with the connected tablet terminal 1 based on a preset threshold value. When the time for communication is less than the threshold value, the radio wave intensity determination unit 35 outputs, to the maintenance communication device 2a, an instruction to disconnect from the wireless network, and terminates the connection to the tablet terminal 1.

A portable terminal represented by the tablet terminal tries to maintain the connection to the currently connected maintenance communication device even when the radio wave intensity is weak, and tries to establish a connection to another maintenance communication device once the currently connected maintenance communication device is disconnected. Therefore, even when the radio wave intensity is weak, the tablet terminal does not try to connect to a maintenance communication device with higher radio wave intensity unless the currently connected maintenance communication device is completely disconnected. Consequently, a delay may occur in displaying a screen on the tablet terminal. According to the present embodiment, the tablet response unit 34 and the radio wave intensity determination unit 35 can select and connect to a maintenance communication device with higher radio wave intensity, thereby avoiding a delay in displaying a screen on the portable terminal. Although the tablet response unit 34 and the radio wave intensity determination unit 35 are not essential components, they can help the tablet terminal 1 connect to a maintenance communication device with higher radio wave intensity in this manner. Alternatively, connectable maintenance communication devices may be displayed on the screen of the tablet terminal 1 so that the user can select a maintenance communication device with higher radio wave intensity.

The tablet response unit 34 and the radio wave intensity determination unit 35 are not necessarily configured as illustrated in FIG. 2 and may be provided in the maintenance communication device 2a.

Figure 3:
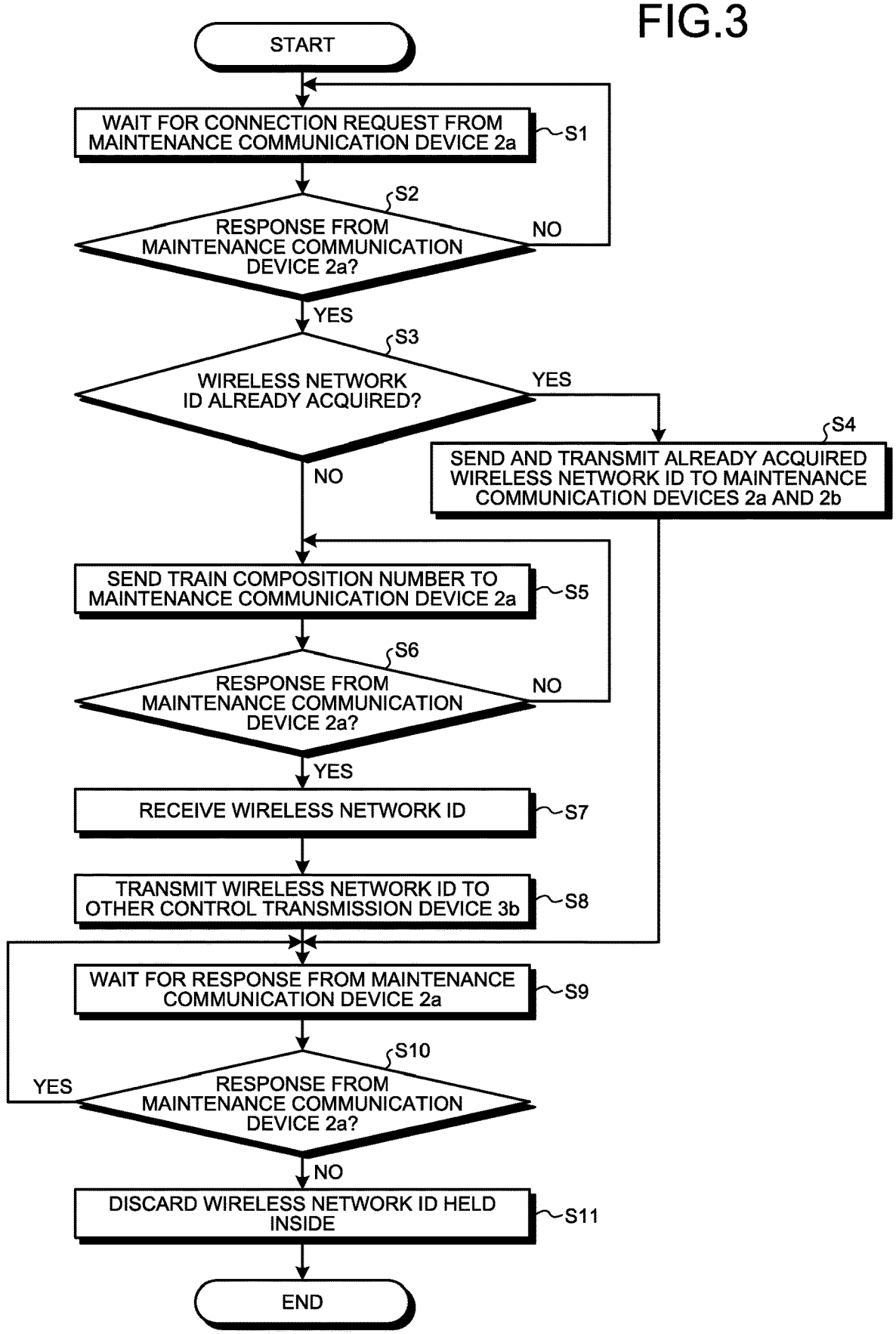
FIG. 3 is a flowchart illustrating the operation of a control transmission device according to the embodiment.

FIG. 3 is a flowchart illustrating the operation of the control transmission device 3a according to the embodiment. Specifically, FIG. 3 illustrates how the new connection determination unit 31, the wireless network reading conversion unit 32, and the wireless network ID transmission unit 33 operate. First, when the process is started, the new connection determination unit 31 starts waiting for a connection request from the maintenance communication device 2a (S1), and determines whether the maintenance communication device 2a has responded (S2).

When no response is received from the maintenance communication device 2a (S2: No), the new connection determination unit 31 continues waiting for a connection request. When receiving a response from the maintenance communication device 2a (S2: Yes), the new connection determination unit 31 determines whether there is a wireless network ID already acquired (S3).

When there is a wireless network ID acquired (S3: Yes), the wireless network ID transmission unit 33 sends and transmits the acquired wireless network ID to the maintenance communication device 2a and the maintenance communication device 2b (S4). When there is no wireless network ID acquired (S3: No), the train composition number notification unit 311 of the new connection determination unit 31 sends the train composition number to the maintenance communication device 2a (S5). Then, the new connection determination unit 31 determines whether the maintenance communication device 2a has responded (S6).

When no response is received from the maintenance communication device 2a (S6: No), the train composition number notification unit 311 of the new connection determination unit 31 sends the train composition number again to the maintenance communication device 2a (S5). When receiving a response from the maintenance communication device 2a (S6: Yes), the wireless network ID reception unit 312 of the new connection determination unit 31 receives a wireless network ID (S7).

Then, the wireless network ID transmission unit 33 transmits the wireless network ID to the control transmission device 3b in the car 4b where the other cab is located (S8). After transmitting the wireless network ID, the new connection determination unit 31 starts waiting for a response from the maintenance communication device 2a (S9). Then, the new connection determination unit 31 determines whether the maintenance communication device 2a has responded (S10). When receiving a response from the maintenance communication device 2a (S10: Yes), the new connection determination unit 31 continues waiting for a response (S9). When no response is received from the maintenance communication device 2a (S10: No), the new connection determination unit 31 discards the wireless network ID held inside (S11) and ends the process.

Figure 4:
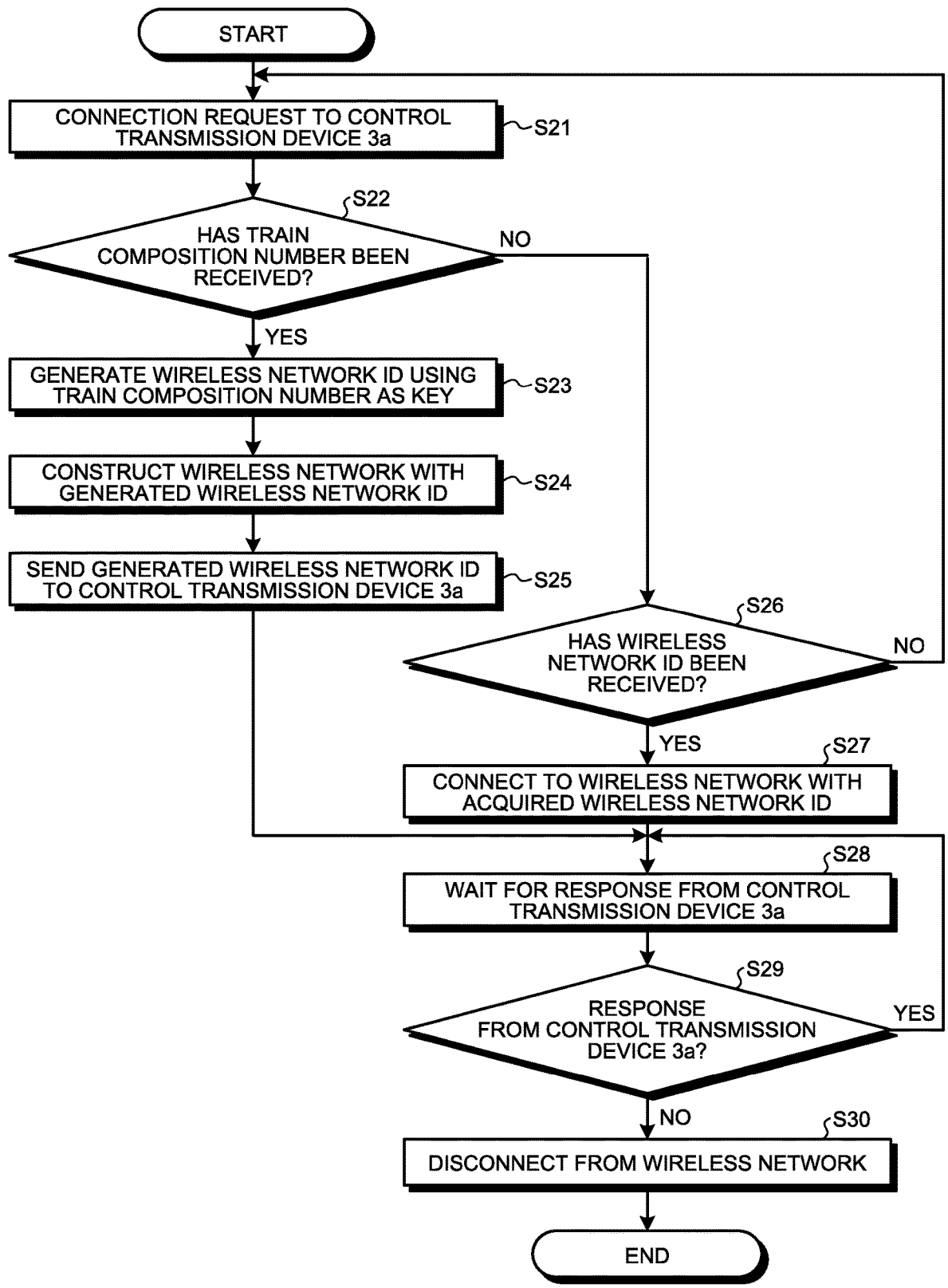
FIG. 4 is a flowchart illustrating the operation of a maintenance communication device according to the embodiment.

FIG. 4 is a flowchart illustrating the operation of the maintenance communication device 2a according to the embodiment. Specifically, FIG. 4 illustrates operation of the wireless network ID generation unit 21 and the wireless network ID acquisition unit 22. First, when the process is started, the maintenance communication device 2a sends a connection request to the control transmission device 3a (S21). Then, the maintenance communication device 2a determines whether the train composition number has been received (S22).

When the train composition number has been received (S22: Yes), the wireless network ID generation unit 21 generates a wireless network ID using the train composition number as a key (S23). Then, the maintenance communication device 2a constructs a wireless network with the generated wireless network ID (S24), and the wireless network ID generation unit 21 sends the generated wireless network ID to the control transmission device 3a (S25). When the train composition number has not been received (S22: No), the wireless network ID acquisition unit 22 determines whether a wireless network ID has been received (S26).

When a wireless network ID has not been received (S26: No), the process returns to S21. When a wireless network ID has been received (S26: Yes), the maintenance communication device 2a connects to the wireless network which has already been constructed with the acquired wireless network ID (S27). After sending the generated wireless network ID to the control transmission device 3a (S25) or after connecting to the wireless network having the acquired wireless network ID (S27), the maintenance communication device 2a starts waiting for a response from the control transmission device 3a (S28). The maintenance communication device 2a then determines whether the control transmission device 3a has responded (S29).

When receiving a response from the control transmission device 3a (S29: Yes), the maintenance communication device 2a continues waiting for a response from the control transmission device 3a (S28). When no response is received from the control transmission device 3a (S29: No), the maintenance communication device 2a disconnects from the wireless network (S30) and ends the process.

Figure 5:
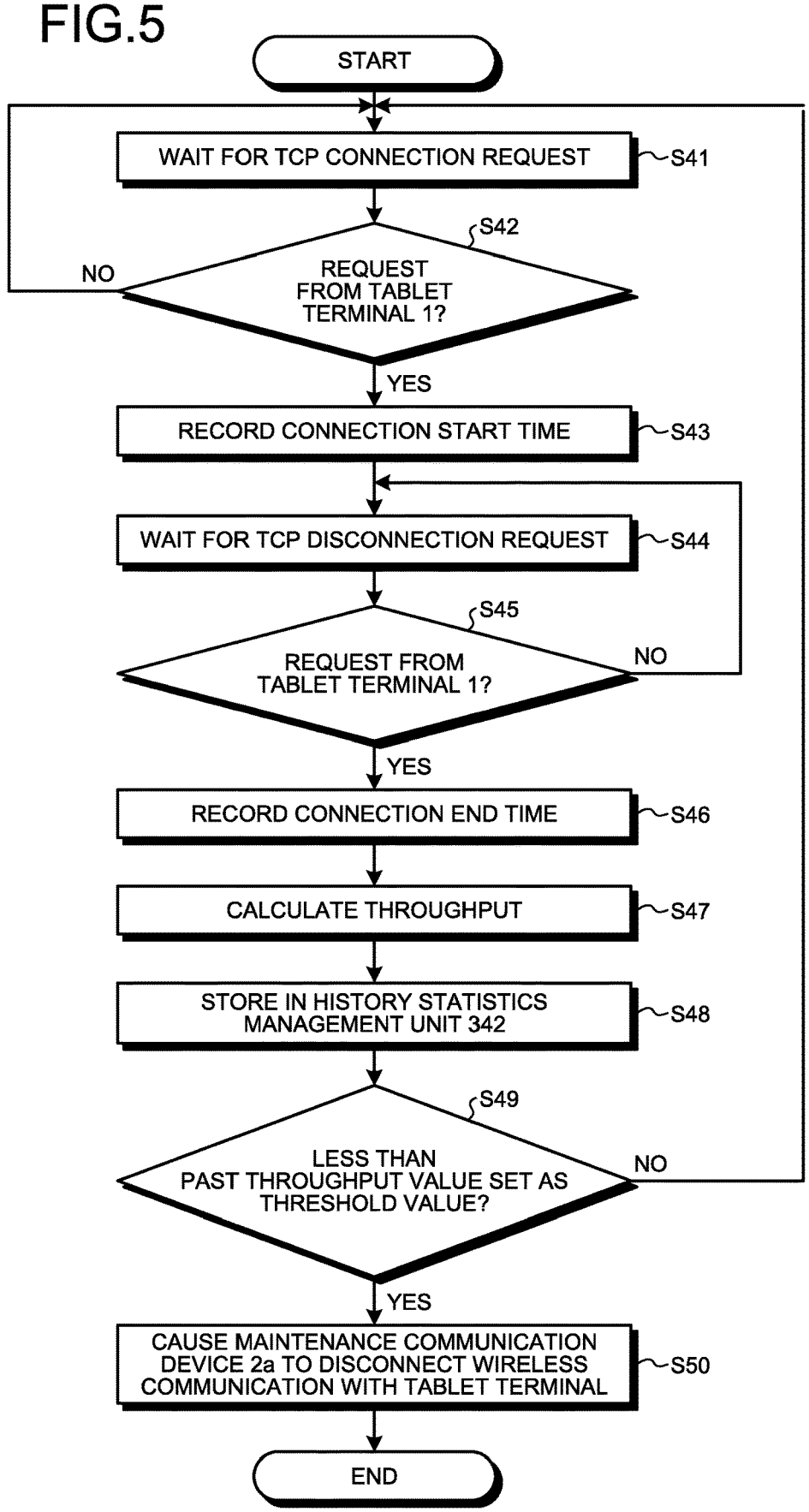
FIG. 5 is a flowchart illustrating the operation of the control transmission device according to the embodiment.

FIG. 5 is a flowchart illustrating the operation of the control transmission device 3a according to the embodiment. Specifically, FIG. 5 illustrates an exemplar operation of the tablet response unit 34 and the radio wave intensity determination unit 35. First, when the process is started, the tablet response unit 34 starts waiting for a transmission control protocol (TCP) connection request (S41), and the tablet response unit 34 determines whether a request from the tablet terminal 1 has reached the control transmission device 3a via the maintenance communication device 2a (S42).

When no request is received from the tablet terminal 1 (S42: No), the tablet response unit 34 continues waiting for a TCP connection request. When receiving a request from the tablet terminal 1 (S42: Yes), the data transfer time measurement unit 341 of the tablet response unit 34 records the connection start time (S43). The tablet response unit 34 starts waiting for a TCP disconnection request (S44), and determines whether a request from the tablet terminal 1 has reached the control transmission device 3a via the maintenance communication device 2a (S45).

When no request is received from the tablet terminal 1 (S45: No), the tablet response unit 34 continues waiting for a TCP disconnection request. When receiving a request from the tablet terminal 1 (S45: Yes), the data transfer time measurement unit 341 of the tablet response unit 34 records the connection end time (S46). Then, the tablet response unit 34 calculates the throughput based on the connection start time and the connection end time (S47), and stores the calculated throughput value in the history statistics management unit 342 of the tablet response unit (S48). After that, the radio wave intensity determination unit 35 determines whether the calculated throughput value is less than a past throughput value set as the threshold value (S49). When the calculated throughput value is not less than the past throughput value set as the threshold value (S49: No), the current connection is to be maintained. Therefore, the process returns to S41. When the calculated throughput value is less than the past throughput value set as the threshold value (S49: Yes), the current connection is not to be maintained. Therefore, the radio wave intensity determination unit 35 causes the maintenance communication device 2a to disconnect the wireless communication with the tablet terminal (S50) and ends the process.

Figure 6:
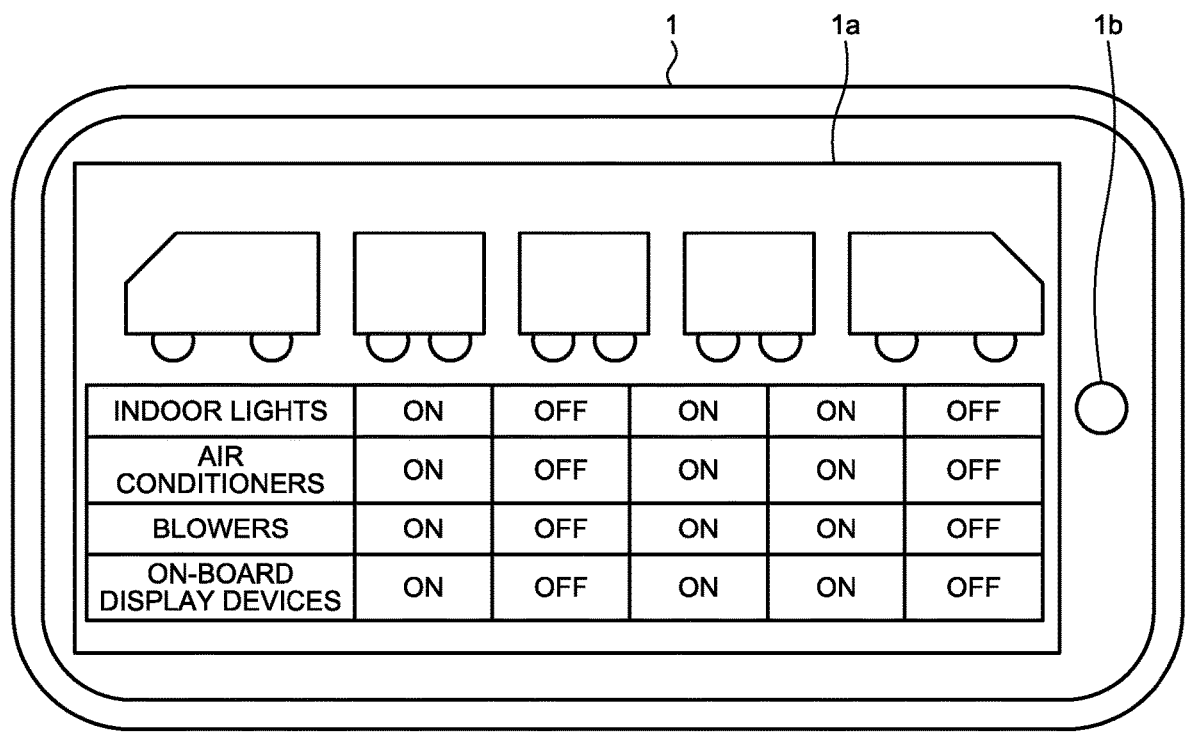
FIG. 6 is a diagram illustrating an example of a tablet terminal in the embodiment.

FIG. 6 is a diagram illustrating an example of the tablet terminal 1 according to the embodiment. The tablet terminal 1 illustrated in FIG. 6 includes a screen 1a and a button 1b. The screen 1a in FIG. 6 shows as an example that the train 4 has five cars. FIG. 6 illustrates each of the cars constituting the train 4, the on/off state of indoor lights in each car, the on/off state of air conditioners in each car, the on/off state of blowers in each car, and the on/off state of on-board display devices in each car. The image on this screen is similar to the image displayed on the cab monitor. The word "similar" as used herein does not necessarily mean that the image on this screen is exactly the same as the image displayed on the cab monitor, but means that the image is shown such that the state of each instrument can be checked and manipulated through the displayed image. As illustrated in FIG. 6, on the screen 1a of the tablet terminal 1, an image similar to the image displayed on the cab monitor can be displayed. Therefore, an operator who performs maintenance work can check the screen displayed on the cab monitor with the tablet terminal 1 while visually monitoring the operation of instruments.

Figure 7:
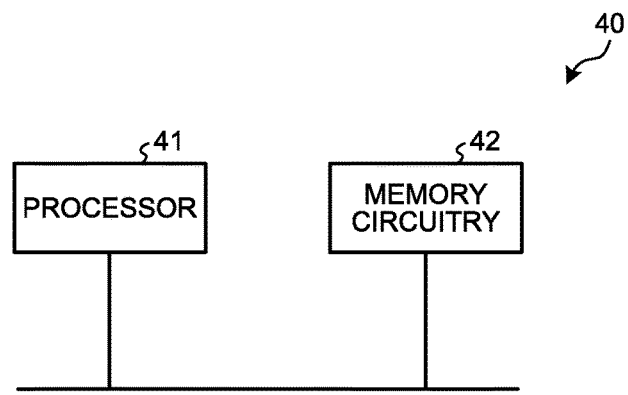
FIG. 7 is a diagram illustrating a general configuration of hardware that implements the maintenance communication devices and the control transmission devices illustrated in FIG. 2 in the embodiment.

FIG. 7 is a diagram illustrating a general configuration of hardware that implements the maintenance communication devices 2a and 2b and the control transmission devices 3a and 3b illustrated in FIG. 2 in the embodiment. The hardware 40 illustrated in FIG. 7 includes a processor 41 and memory circuitry 42, which are connected to a bus. The processor 41 performs, by software, calculations and control using data obtained from the bus. The memory circuitry 42 stores data and the software that are necessary for the processor 41 to perform calculations and control. Such software can be, for example, a train maintenance communication program for operating the control transmission device and the maintenance communication device as described with reference to FIGS. 3 to 5. In a case where each of the maintenance communication devices 2a and 2b is realized by the hardware 40, the processor 41 reads a calculation formula stored in the memory circuitry 42 and performs calculations based on the train composition number obtained from the bus to generate a wireless network ID. In a case where each of the control transmission devices 3a and 3b is realized by the hardware 40, the processor 41 outputs the train composition number, which is data stored in the memory circuitry 42, to the bus, and adds a destination to the wireless network ID, which is data acquired from the bus, for output to the bus. Note that an example of the hardware 40 is a computer.

According to the present embodiment described above, all the cars of the same train composition can use the same wireless network ID that is generated each time it is needed. Therefore, it is possible to prevent erroneous connection to wireless networks of adjacent pit tracks at a railyard. The prevention of erroneous connection to wireless networks of adjacent pit tracks enables simultaneous maintenance work at pit tracks adjacent to one another.

In the embodiment described above, the maintenance system including the control transmission devices and the maintenance communication devices has been described. However, the present invention is not limited to this, and the control transmission devices may include maintenance communication units that implement the maintenance communication devices.

The configuration described in the above-mentioned embodiment indicates an example of the contents of the present invention. The configuration can be combined with another well-known technique, and a part of the configuration can be omitted or changed in a range not departing from the gist of the present invention.

REFERENCE SIGNS LIST 1 tablet terminal; 1a screen; 1b button; 10 train maintenance system; 2a, 2b maintenance communication device; 21 wireless network ID generation unit; 22 wireless network ID acquisition unit; 3a, 3b control transmission device; 31 new connection determination unit; 311 train composition number notification unit; 312 wireless network ID reception unit; 32 wireless network reading conversion unit; 33 wireless network ID transmission unit; 34 tablet response unit; 341 data transfer time measurement unit; 342 history statistics management unit; 35 radio wave intensity determination unit; 36a, 36b port; 4 train; 4a, 4b car; 40 hardware; 41 processor; 42 memory circuitry; 5 wireless network.

The invention claimed is:

1. A control transmission device mounted on a train, the control transmission device comprising:
a port connectable by wire to an external terminal;
a processor to execute a program; and
memory circuitry to store the program which, when executed by the processor, performs processes of,
providing notification of a train composition number of the train; and
receiving a wireless network ID for constructing a wireless network, wherein
the received wireless network ID is generated based on the provided train composition number, and the processor transmits the received wireless network ID to another control transmission device mounted on the train of a same train composition.

2. The control transmission device according to claim 1, wherein
the notification of the train composition number is provided when the external terminal is connected to the port.

3. The control transmission device according to claim 1, comprising, for wireless communication over the wireless network:
the processor measures a ratio between an amount of data communication and a transfer time; and
records a communication history provided by the measurement.

4. The control transmission device according to claim 3, wherein
the processor further monitors the recorded communication history, and determines whether the measured ratio is equal to or more than a preset threshold value.

5. The control transmission device according to claim 1, the processor further converts the wireless network ID into an image readable by a camera or a sound recognizable by a microphone.

6. A maintenance communication device comprising:
a processor to execute a program; and
memory circuitry to store the program which, when executed by the processor, performs processes of,
receiving a train composition number of a train from a control transmission device mounted on the train, and generating a wireless network ID using the received train composition number as a key;
receiving a wireless network ID generated in a car of a same train composition; and
transmitting the wireless network ID generated by the maintenance communication device to the control transmission device for construction of a wireless network and for transmission of the generated wireless network ID to another control transmission device mounted on the train of a same train composition.

7. The maintenance communication device according to claim 6, wherein
for the wireless network ID, the generated wireless network ID or the received wireless network ID is used.

8. A train maintenance system comprising:
a control transmission device mounted on a train, the control transmission device including a port connectable by wire; a first processor to execute a first program; and first memory circuitry to store the first program which, when executed by the first processor, performs processes of, providing notification of a train composition number of the train; and
a maintenance communication device including a second processor to execute a second program; and second memory circuitry to store the second program which, when executed by the second processor, performs processes of, receiving the train composition number provided by the first processor and generating a wireless network ID using the received train composition number as a key, wherein
the first processor of the control transmission device receives the wireless network ID and transmits the received wireless network ID to another control transmission device mounted on the train of a same composition.

9. The train maintenance system according to claim 8, wherein
the first processor notifies the maintenance communication device of the train composition number when being connected to the maintenance communication device.

10. The train maintenance system according to claim 9, wherein
the first processor receives the wireless network ID generated by the second processor.

11. The train maintenance system according to claim 10, wherein
the second processor receives a wireless network ID generated by another maintenance communication device connected to the another control transmission device.

12. The train maintenance system according to claim 11, wherein the maintenance communication device constructs a wireless network using the generated wireless network ID or the received wireless network ID to perform wireless communication.

13. The train maintenance system according to claim 12, wherein
the first processor further measures a ratio between an amount of data communication and a transfer time;
records a communication history provided by the measurement; and
monitors the recorded communication history, and determines whether the measured ratio is equal to or more than a preset threshold value.

14. The train maintenance system according to claim 13, wherein
the first processor outputs a command to disconnect the wireless communication to the maintenance communication device in response to determining that the measured ratio is less than the preset threshold value.

* * * * *